(12) United States Patent
Quinn et al.

(10) Patent No.: US 7,752,271 B2
(45) Date of Patent: Jul. 6, 2010

(54) METHOD OF RETRACTING AN INSTANT MESSAGE

(75) Inventors: Michael William Quinn, Lexington, KY (US); Malissa Galloway Sullivan, Versailles, KY (US); Anthony Eugene Payne, Lexington, KY (US); Kevin Joel Solie, Lexington, KY (US); Andrew Ortwein, Lexington, KY (US)

(73) Assignee: International Business Machines Corporation, Armonk, NY (US)

( * ) Notice: Subject to any disclaimer, the term of this patent is extended or adjusted under 35 U.S.C. 154(b) by 1277 days.

(21) Appl. No.: 10/858,033

(22) Filed: Jun. 1, 2004

(65) Prior Publication Data

US 2005/0267942 A1 Dec. 1, 2005

(51) Int. Cl.
*G06F 15/16* (2006.01)
*G06F 3/00* (2006.01)

(52) U.S. Cl. ............... 709/206; 709/203; 715/758
(58) Field of Classification Search ............... 709/206
See application file for complete search history.

(56) References Cited

U.S. PATENT DOCUMENTS

| 5,333,266 | A | * | 7/1994 | Boaz et al. ............... 709/206 |
| 7,269,793 | B2 | * | 9/2007 | Horsfall et al. ............ 715/751 |
| 2003/0033212 | A1 | * | 2/2003 | Sandhu et al. ............. 705/26 |
| 2004/0158611 | A1 | * | 8/2004 | Daniell et al. ............ 709/206 |
| 2004/0205134 | A1 | * | 10/2004 | Digate et al. ............. 709/206 |
| 2005/0114533 | A1 | * | 5/2005 | Hullfish et al. ........... 709/230 |
| 2005/0149622 | A1 | * | 7/2005 | Kirkland et al. .......... 709/207 |
| 2005/0223064 | A1 | * | 10/2005 | Salerno et al. ........... 709/206 |

FOREIGN PATENT DOCUMENTS

CA 2339228 * 1/2001

* cited by examiner

*Primary Examiner*—George C Neurauter, Jr.
*Assistant Examiner*—Mark D Fearer
(74) *Attorney, Agent, or Firm*—Guerin & Rodriguez, LLP

(57) ABSTRACT

Described is a method for retracting an instant message from a receiver in an instant messaging session. A request is made to retract the instant message from the receiver. If the receiver is present in the session, the instant message is removed from the user interface of the receiver. Notification is sent to the requestor to indicate whether the instant message was successfully retracted and whether the instant message was saved by the receiver. Optionally, the method allows an entry made in an instant messaging log to be retracted when the corresponding instant message is retracted.

7 Claims, 3 Drawing Sheets

METHOD OF RETRACTING AN INSTANT MESSAGE

FIELD OF THE INVENTION

The invention relates generally to instant messaging in a computer network. In particular, the invention relates to a method for retracting an instant message from a receiver in an instant messaging session.

BACKGROUND OF THE INVENTION

The electronic workplace of today is filled with many conveniences to allow employees to collaborate with each other. Some workplace environments allow employees ready access to each other through real time communications such as instant messaging. Under many circumstances instant messaging increases employee efficiency. However, in large organizations where employees have broad access to other employees, an employee can experience numerous interruptions through instant messaging. Similarly, highly valued employees can receive numerous interruptions in the form of instant messages (IMs) requesting information. Such interruptions are more difficult to limit than telephone communications and face-to-face interactions. Moreover, a high volume of IMs can hinder the employee's ability to perform their required workplace tasks.

Another problem associated with instant messaging is the risk of sending an IM to an unintended recipient. Serious consequences can occur, depending on the content of the IM and the identity of the unintended recipient. For example, if two business managers are discussing matters affecting an employee, one of the managers may become confused and inadvertently send an IM to the employee instead of the other manager. If the sending manager discovers the error, that manager can ask the employee to ignore or discard the IM. However, the employee has the ability to save the IM and may choose to share the content of the IM with others. Difficulties with the existence of the IM are compounded in a network having a logging capability.

What is needed is a method to enable the sender of an IM to retract the IM from the receiver. The present invention satisfies this need and provides additional advantages.

SUMMARY OF THE INVENTION

In one aspect, the invention features a method for retracting an instant message from a receiver in an instant messaging session. A request that an instant message be retracted from a receiver in the instant messaging session is made. The instant message is retracted from the receiver if the receiver is present in the instant messaging session and the requestor is notified as to whether the instant message was retracted from the receiver.

In another aspect, the invention features a computer program product for use with a computer system having a requestor, a server and a receiver. The computer program product includes a computer useable medium having embodied therein program code for requesting that an instant message be retracted from an instant messaging session, program code for retracting the instant message from the receiver if the receiver is present in the instant messaging session and program code for notifying the requestor as to whether the instant message has been retracted from the receiver.

In yet another aspect, the invention features a computer data signal embodied in a carrier wave for use with a computer system having a requestor, a server and a receiver. The computer data signal includes program code for requesting that an instant message be retracted from an instant messaging session, program code for retracting the instant message from the receiver if the receiver is present in the instant messaging session and program code for notifying the requestor as to whether the instant message has been retracted from the receiver.

In still another aspect, the invention features an apparatus for retracting an instant message from a receiver in an instant messaging session. The apparatus includes means for requesting that an instant message be retracted from a receiver in the instant messaging session, means for retracting the instant message from the receiver if the receiver is present in the instant messaging session and means for notifying a sender as to whether the instant message has been retracted from the receiver.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not necessarily to scale, emphasis instead being placed upon illustrating the principles of the invention.

DETAILED DESCRIPTION

In brief overview the present invention relates to a method for retracting an instant message (IM) from a receiver. A request is issued to retract a previously sent IM transmitted from a sender to the receiver. As used herein, a sender refers to a user or a user device that sends the IM. Similarly, a receiver refers to a user or a user device that receives the IM. Sending devices and receiving devices include, by way of example, personal computers (PCs), personal digital assistants (PDAs), cell phones and other devices having a user interface to enter IM content and to display received IMs to a user. According to the invention, if the receiver is present in an ongoing instant messaging session (IM session), the IM is removed from the receiver's user interface. Subsequently, the sender is alerted as to whether the IM was retracted from the receiver and whether the IM was saved by the receiver.

Figure 1:
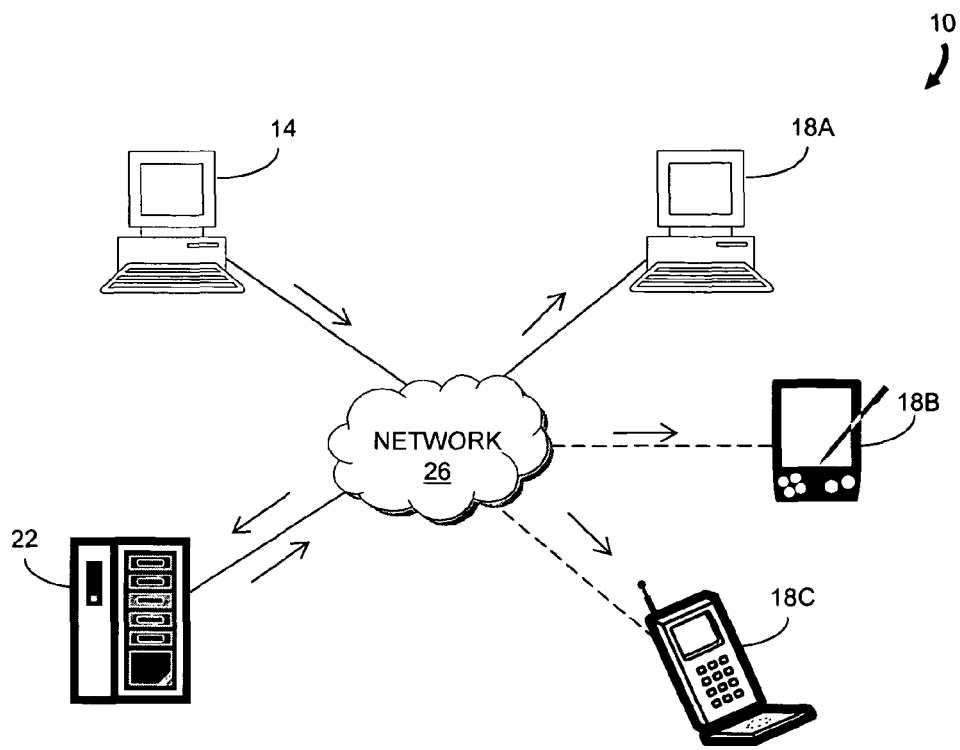
FIG. 1 is an illustration of a networked environment for instant messaging and includes a sender, multiple receivers and a server.

Referring to FIG. 1, a network environment 10 in which the invention may be practiced includes a sender 14 and multiple receivers 18 in communication with each other and an IM server 22 over a network 26. The network 26 can be an intranet, the Internet or any network or combination of networks that supports the transmission of data between the sender 14, the receivers 18 and the IM server 22. By way of illustration, the sender 14 is a personal computer (PC) and the receivers 18 include a PC 18A, a personal digital assistant (PDA) 18B and a text messaging or web-enabled cell phone 18C. The sender 14 has the capability to send IM messages to the IM server 22 for distribution to one or more receivers 18. Each receiver 18 can receive IM messages from the IM server 22 that were generated by the sender 14. Generally, a device use to send an IM can also operate as a receiver 18 and a device used to receive an IM can also operate as a sender 14; the particular characterization of the device as described herein depending on whether an IM is being sent or received. Two types of data are transferred between the sender 14 and the server 22, and between the server 22 and the receivers 18. IM data are transmitted and represent the content and associated overhead information of the human-interpretable message (e.g., text) conveyed between users. Network request data and network response data are also transmitted. The network data adhere to a network protocol, such as modified versions of session initiation protocol (SIP) and SIP for Instant Messaging and Presence Leveraging Extensions (SIMPLE), and are used to control the IM session without affecting the content of the IMs.

Figure 2:
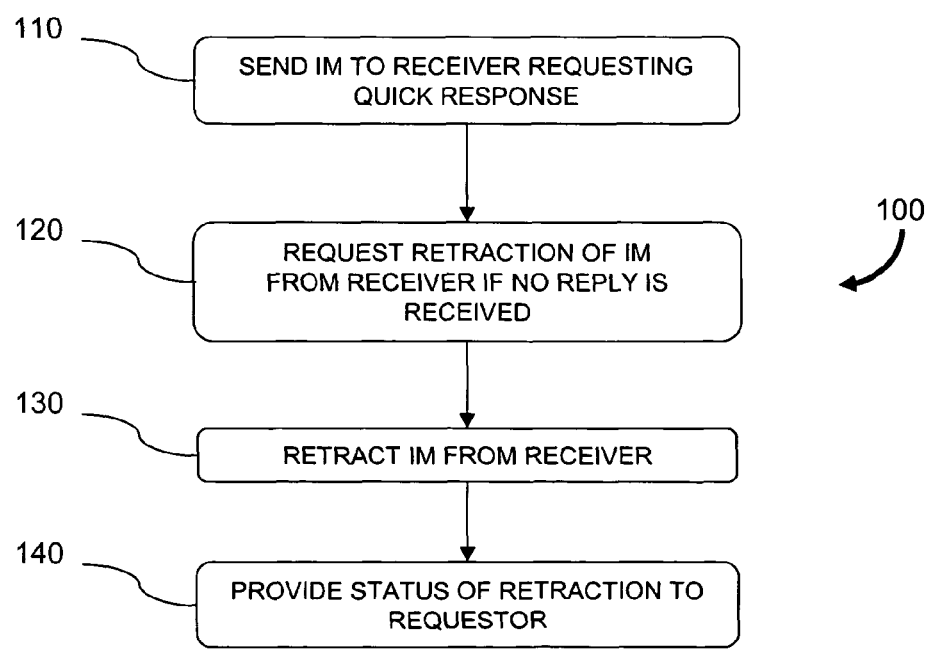
FIG. 2 is a flowchart representation of an embodiment of a method for retracting an IM from a receiver in accordance with the invention.

FIG. 2 depicts one process 100 in which a sender 14 retracts an IM from a receiver 18 in accordance with the invention. In this illustrative example, the sender 14 sends (step 110) an IM to a receiver 18 to obtain a time-critical response. For instance, the sender 14 may require missing information to complete a report before a deadline (e.g., 15 minutes). In another instance, the sender 14 may seek information from one colleague in order to quickly respond (e.g., within 30 seconds) to another colleague engaged in a telephone conversation with the sender 14. The requested information may have no value to the sender 14 if it is provided after the deadline. Moreover, the sender 14 may wish to try to quickly obtain the information from a different receiver 18 if the information is not made readily available by the receiver 18 of the original IM. Thus the sender 14 requests (step 120) a "hangup" (i.e., that the IM be retracted from the receiver) if no reply is received in an acceptable time. A sender 14 manually requests a retraction of the IM, for example, by a mouse-click or similar user interface operation. Alternatively, the retraction request is automatically issued after a predetermined time or is generated after the expiration of a time period specified by the sender 14 when the IM was generated. In response to the retraction request and if the receiver has not already begun to respond, the IM is retracted (step 130) from the receiver 18 by removing any reference to the IM from the receiver's user interface. Retraction includes closing the current IM window on both the sender 14 and the receiver 18. If the receiver is in the process of responding, the hangup feature is disabled or removed from the sender's user interface. Advantageously, retraction of the IM prevents the receiver 18 from being needlessly interrupted to respond to an "expired" IM request for assistance. A status message or report is generated by the server 22 and provided (step 140) to the sender 14 to indicate that the retraction attempt was successful. Retraction can fail, however, if the receiver 18 has saved the IM, either automatically or manually, before the server 22 receives the retraction request from the sender 14.

Figure 3:
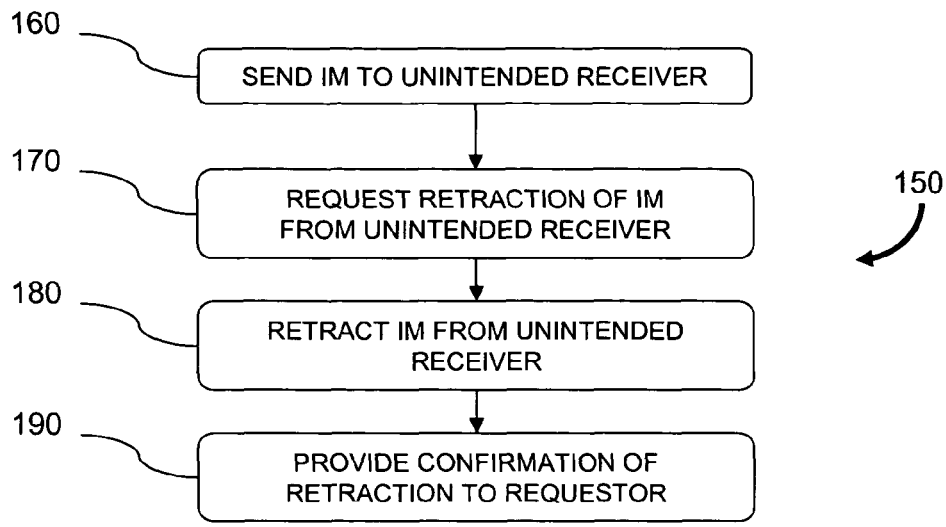
FIG. 3 is a flowchart representation of another embodiment of a method for retracting an IM from a receiver in accordance with the invention.

Other situations can occur for which the method of the present invention is advantageous. For example, the sender 14 can be involved in an IM session with a receiver 18 in which confidential information is discussed. As shown in FIG. 3, in such a process 150 the sender 14 inadvertently sends (step 160) an IM to a different (i.e., unintended) receiver 18. The sender 14 may be momentarily distracted and accidentally send a confidential IM to the different receiver 18. If the sender 14 then recognizes that the IM was sent to an unintended receiver 18, the sender 14 requests (step 170) that the IM be retracted, or revoked. The IM is then retracted (step 180) by removing it from the user interface of the unintended receiver 18. Consequently, the unintended receiver 18 may never realize that the IM was sent. After the retraction is completed, a notification is provided (step 190) to the sender 14 indicating that the retraction was successful.

The above examples describe successful retractions of an IM. However, in some instances the IM may have been saved by the receiver 18 before the retraction attempt occurred. In these instances, the report generated by the server 22 indicates that the IM was already saved. In other instances, the report indicates that the receiver 18 has left the IM session and retraction did not occur.

Figure 4:
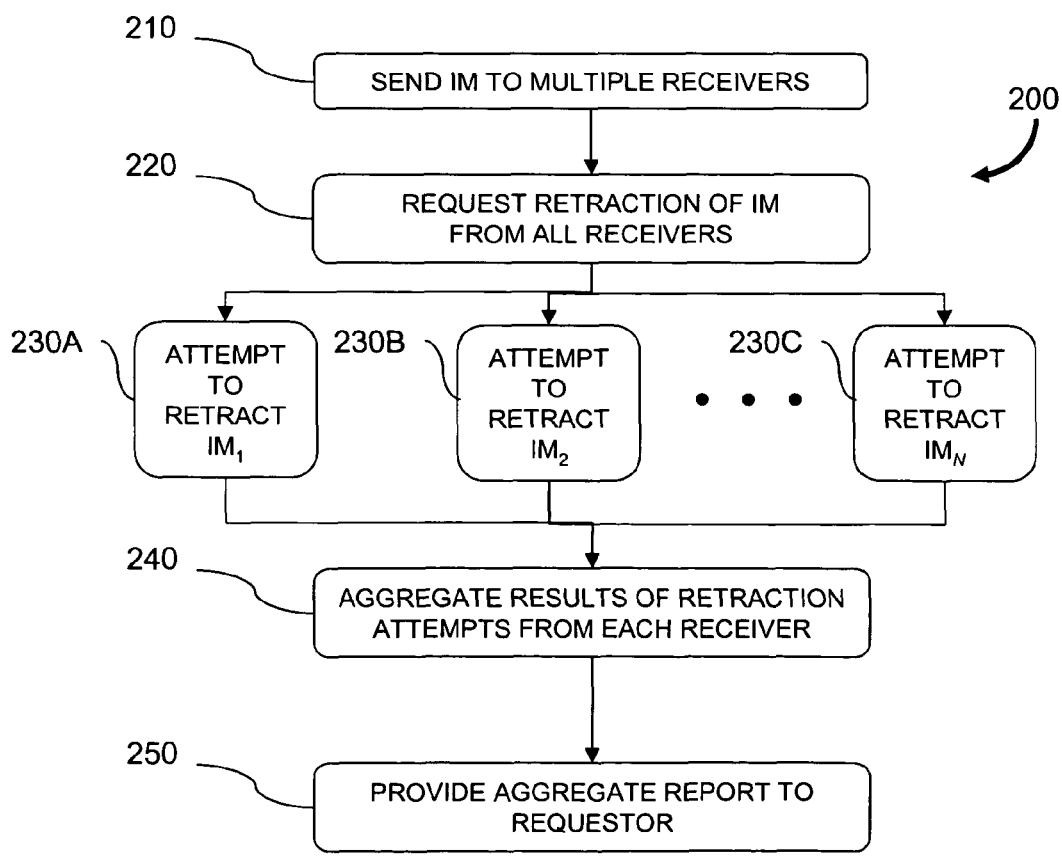
FIG. 4 is a flowchart representation of an embodiment of a method for retracting an IM from multiple receivers in accordance with the invention.

The above examples are limited to two-way chats, however, the principles of the invention also apply to IM sessions that include any number of participants. FIG. 4 illustrates an embodiment of a method 200 for retracting an IM from multiple receivers 18. The sender 14 sends an IM to the server 22 which broadcasts (step 210) the IM to N receivers 18. After determining that the IM should be retracted, the sender 14 requests (step 220) a retraction from all the receivers 18. In an alternative embodiment (not shown), the method permits the requestor to seek retraction by identifying specific receivers 18 without retracting the IM from all the receivers 18. The server 22 attempts to retract (steps 230A to 230N) the IM by sending a network request to each receiver 18. The server 22 then determines for each receiver 18 whether the retraction attempt was successful and aggregates (step 240) the results in a single report. The aggregate report is provided (step 250) to the sender 14 who may take other actions based upon the information in the report. The report can list the receivers 18 determined to be off-line and the receivers 18 that saved the IM. In an alternative embodiment, the aggregate report is replaced by individual reports each listing the status of the retraction attempt for a particular receiver 18.

Figure 5:
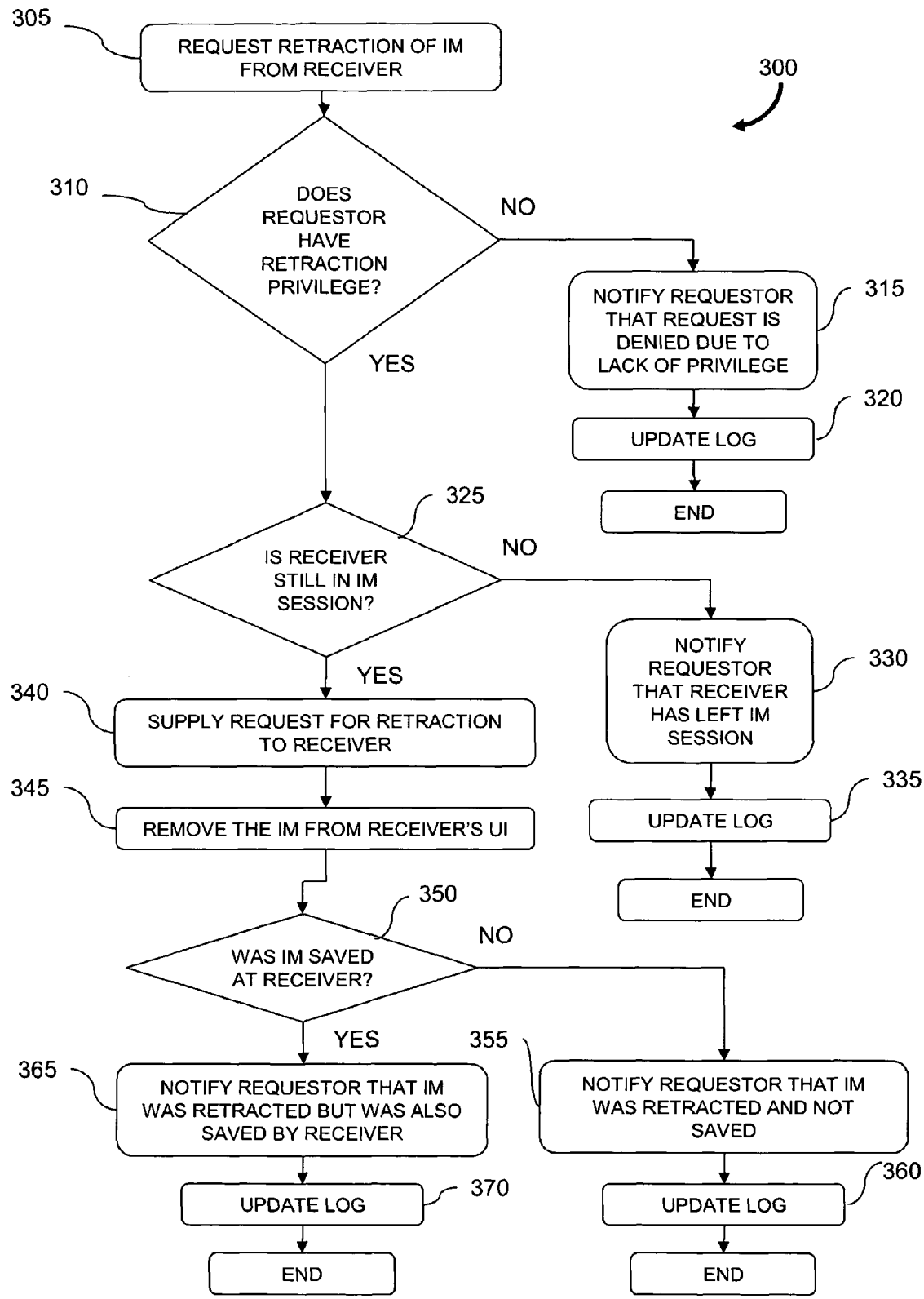
FIG. 5 is a flowchart representation of another embodiment of a method for retracting an IM from a receiver in accordance with the invention.

FIG. 5 illustrates an embodiment of a detailed method 300 for retracting an IM from a receiver 18 for a system having an IM logging capability. As described above, a request for retraction of an IM is issued (step 305) by a requestor. Each IM has an associated unique identification (ID) such as a standard globally unique ID (GUID) or a combination of one or more of a session ID, a server ID, a user ID and the like. The request is made by selecting the IM from the user interface of the sender 14. In one option, the sender 14 executes a synchronous function provided to retract the specific IM according to its unique ID. Invoking the synchronous function results in a network request being transmitted to the IM server 22.

If the server determines (step 310) that a requestor does not have a retraction privilege for the IM, any attempt by the requestor to remove the IM from the receiver 18 is ignored. This security feature can reduce vulnerability to disruption by hackers and unauthorized personnel. An optional notification is sent (step 315) to the requestor indicating that the request for retraction is denied due to lack of privilege. In this embodiment, the attempt to retract the IM is entered (step 320) into a log database. The log entry can include information associated with the attempt such as the identification of the requestor, identification of the receiver of the IM and the time of the request.

If the requestor has a retraction privilege, the IM server 22 determines (step 325) whether the receiver 18 is present in the IM session by transmitting a network request to the receiver 18. If the receiver 18 is no longer present, the requestor is notified (step 330) that the receiver 18 has left the IM session. In this case, the IM server 22 cannot determine whether the IM was saved by the receiver 18. Optionally, the attempt to retract the IM can be entered (step 335) into the IM log.

If the receiver 18 is still present in the IM session, the IM server 22 transmits (step 340) a network request to the receiver 18 to remove the IM from the receiver user interface. The IM is removed (step 345) from the receiver's user interface and a determination is made (step 350) as to whether the IM was saved by the receiver 18. If the IM was not saved, the requestor is notified (step 355) that the IM was successfully retracted and not saved. Alternatively, if the IM was saved, the requestor is notified (step 365) that the IM was retracted but was already saved by the receiver 18. Optionally, a log is updated (step 360 or step 370) to indicate that a retraction occurred for an earlier logged IM. In another option, the log is updated by retracting (i.e., erasing) an earlier log entry that indicated the transmission of the IM to the receiver 18. The latter option preserves the privacy of the requestor by eliminating any trace of the IM in the log database.

While the invention has been shown and described with reference to specific embodiments, it should be understood by those skilled in the art that various changes in form and detail may be made therein without departing from the spirit and scope of the invention. For example, one embodiment described the implementation of a method for retracting an IM in a system having logging capabilities. The principles of the invention can also be applied to IM systems having other entities in which it may be desirable to retract or modify IM related entries.

What is claimed is:

1. A method for retracting an instant message from a receiver in an instant messaging session, the method comprising:

requesting that an instant message be retracted from a receiver in the instant messaging session, the instant message being selected according to an assigned message ID;

retracting the same instant message from the receiver after the instant message has been received at a user interface at the receiver, if the receiver is present in the instant messaging session; and notifying the requestor as to whether the instant message has been retracted from the receiver.

2. The method of claim 1 wherein the retraction of the instant message comprises removing the instant message from the receiver user interface.

3. The method of claim 1 further comprising posting an entry in a session log to indicate that a request for retraction occurred.

4. The method of claim 1 further comprising removing an entry from a session log, the entry indicating that an instant message was transmitted from a sender to the receiver.

5. The method of claim 1 wherein the requesting occurs at a predetermined time after the generation of the instant message to be retracted.

6. The method of claim 1 further comprising:

determining whether a requestor requesting that the instant message be retracted is the sender of the instant message; and preventing the retraction of the instant message if the requestor is not the sender.

7. The method of claim 1 wherein the step of requesting comprises requesting that an instant message be retracted from a plurality of receivers in the instant messaging session and wherein the step of notifying comprises notifying the requestor as to whether the instant message has been retracted from each of the receivers.

* * * * *